(12) United States Patent
Fox et al.

(10) Patent No.: US 7,631,716 B2
(45) Date of Patent: Dec. 15, 2009

(54) COTTON HARVESTER CHASSIS CONFIGURATION

(75) Inventors: Jeffrey Robert Fox, Minburn, IA (US); Michael Lee Pearson, Ankeny, IA (US); Robert Matthew Bares, Johnston, IA (US)

(73) Assignee: Deere & Company, Moline, IL (US)

( * ) Notice: Subject to any disclaimer, the term of this patent is extended or adjusted under 35 U.S.C. 154(b) by 129 days.

(21) Appl. No.: 11/493,734

(22) Filed: Jul. 26, 2006

(65) Prior Publication Data

US 2008/0022648 A1 Jan. 31, 2008

(51) Int. Cl.
*B62D 61/02* (2006.01)

(52) U.S. Cl. ............. 180/219; 180/291; 180/900; 56/13.1; 56/28

(58) Field of Classification Search ............. 180/311, 180/900, 352, 312, 89.12, 89.17, 219, 291; 280/781, 98, 791, 799, 798; 56/10.1, 14.5, 56/12.5, 14.6, 341, 13.1, 30, 28
See application file for complete search history.

(56) References Cited

U.S. PATENT DOCUMENTS

| | | | |
|---|---|---|---|
| 4,553,378 A * | 11/1985 | Fachini et al. ............. 56/16.6 |
| 4,996,831 A * | 3/1991 | Pearson et al. ............. 56/16.6 |
| 5,029,436 A * | 7/1991 | Fredriksen et al. ........... 56/14.5 |
| 5,152,364 A | 10/1992 | Woods et al. ................ 180/292 |
| 5,406,779 A | 4/1995 | Deutsch et al. ................. 56/32 |
| 5,460,236 A | 10/1995 | Lewis et al. .................. 180/267 |
| 5,462,487 A * | 10/1995 | Farley et al. ................. 56/14.5 |
| 5,466,189 A | 11/1995 | Deutsch et al. ............. 460/100 |
| 5,499,491 A | 3/1996 | Deutsch et al. ............. 56/10.2 |
| 5,609,523 A * | 3/1997 | Ringwald et al. ............. 56/28 |
| 6,018,938 A | 2/2000 | Deutsch et al. ................. 56/32 |
| 6,263,650 B1 | 7/2001 | Deutsch et al. ............. 56/16.4 |
| 6,366,210 B2 * | 4/2002 | Lemke ......................... 56/28 |
| 6,421,992 B1 * | 7/2002 | Goering et al. ................. 56/28 |
| 6,421,996 B1 * | 7/2002 | Deutsch et al. ............. 56/341 |
| 6,588,189 B2 | 7/2003 | Horejsi et al. .................. 56/28 |
| 6,901,732 B2 | 6/2005 | Bares et al. .................. 56/341 |
| 6,928,797 B1 * | 8/2005 | Brantley ..................... 56/12.9 |
| 6,938,401 B2 * | 9/2005 | Bares et al. .................. 56/13.1 |
| 6,941,740 B2 | 9/2005 | Fox et al. ..................... 56/341 |

* cited by examiner

*Primary Examiner*—Hau V Phan

(57) ABSTRACT

Cotton harvester frame structure includes main structural members elevated to approximately cab floor level and extending horizontally rearwardly in a planar fashion over the engine compartment and the rear axle. The structural members attach to the central portion of the rear axle to provide added clearance for larger wheels and tires. The single elevated plane of the main frame structure provides simplified attachment of a power module including a transversely mounted engine. Access areas under the main structural members are of sufficient minimum width and height to allow an operator or an assembler to stand fairly erect while accessing most areas of the power module and a harvester fan.

13 Claims, 4 Drawing Sheets

COTTON HARVESTER CHASSIS CONFIGURATION

FIELD OF THE INVENTION

The present invention relates generally to agricultural harvesters and, more specifically, to a frame for a harvester.

BACKGROUND OF THE INVENTION

As capacity of agricultural harvesters increases, the added size and weight of the machines require larger tires and wheels. Maintaining an acceptable harvester turn radius, particularly with oscillating steerable rear axles having large capacity wheels, is a continuing source of difficulty.

On harvesters such as cotton pickers, the ability to provide either a conventional cotton basket or a special cotton processing system such as a cotton baler would be very advantageous. However, most presently available frame systems fail to easily accommodate such a conversion. Also, providing convenient access to components such as the engine, tanks, cab, and crop handling systems on the large capacity machines is complicated by the size of the required components. Although transversely mounted power systems such as shown in commonly assigned U.S. Pat. Nos. 5,499,491 and 6,901,732 have alleviated some of the problems, clearance at the front and rear of the of the power system support frame is limited and makes access to the sides of the of the engine relatively difficult.

SUMMARY OF THE INVENTION

It is therefore an object of the present invention to provide an improved harvester frame structure that overcomes most or all of the aforementioned problems. It is another object to provide such frame structure that is particularly useful for a cotton harvester.

It is a further object to provide in improved harvester frame structure with wheel structure that accommodates large capacity components and yet has a turning radius comparable to more conventional lower capacity harvesters. It is another object to provide such structure particularly useful with oscillating steerable rear axles.

It is still another object to provide a harvester frame structure supporting a transversely mounted engine having increased access to the sides of the engine compared to at least most previously available frame structures. It is a further object to provide such a structure having increased vertical clearance adjacent the engine and providing simplified attachment of a power module including one or more components such as a transversely mounted engine, a hydraulic pump and a cooling system.

It is another object to provide a harvester frame structure that establishes a platform for conveniently attaching modular components such as an engine module, tanks, a cab, and crop handling systems. It is still another object to provide such a frame structure that facilitates access to and interchanging or components.

Harvester frame structure constructed in accordance with teachings of the present invention includes a front axle similar to existing front axle structures. However, behind the front axle the main structural members are elevated to approximately the floor level of a cab and extend horizontally rearwardly in a planar fashion over the engine compartment and over the rear axle. A rear axle support extends downwardly from the plane of the main frame and attaches to the central portion of the rear axle to provide added clearance for larger wheels and tires by eliminating the chassis width restriction in relation to the steering angle. With the elevated frame and central rear axle connection, the steering angle of a high capacity machine can be maintained or even improved compared to a lower capacity machine with a more conventional frame structure. The frame structure is lengthened, and a power module support depends from the underside of the frame supporting a power module including a transverse engine and driven components. Accommodation spaces are provided behind the front drive wheels and forwardly of the rear steerable wheels. The accommodation spaces extend between the sides and are of sufficient minimum width and height to allow an operator or an assembler to stand fairly erect while accessing most areas of the power module and the, harvester fan.

In addition to improving steering angle and providing additional vertical clearance for access areas on either side of a transversely extending engine in the engine compartment, the single elevated plane of the main frame structure provides simplified attachment of a power module including, for example, the transversely mounted engine, a hydraulic pump and a cooling module. Sufficient vertical clearance between ground and the elevated plane of the frame allows an operator convenient access to most all areas adjacent the sides of the engine including the area of a harvester fan. Since the operator can stand fairly erect, work on the power module can be completed faster and more conveniently with less fatigue.

The frame structure provides for logical and sequential attachment of components in varying levels of assembly. For a cotton picker, the attachment sequence includes tanks, cab, and cotton handling system. The arrangement of the frame structure allows a conventional basket to be attached in place of the handling system.

These and other structures, features and advantages of the present invention will become apparent upon reading the following detailed description in view of the drawings.

DESCRIPTION OF THE PREFERRED EMBODIMENT

Figure 1:
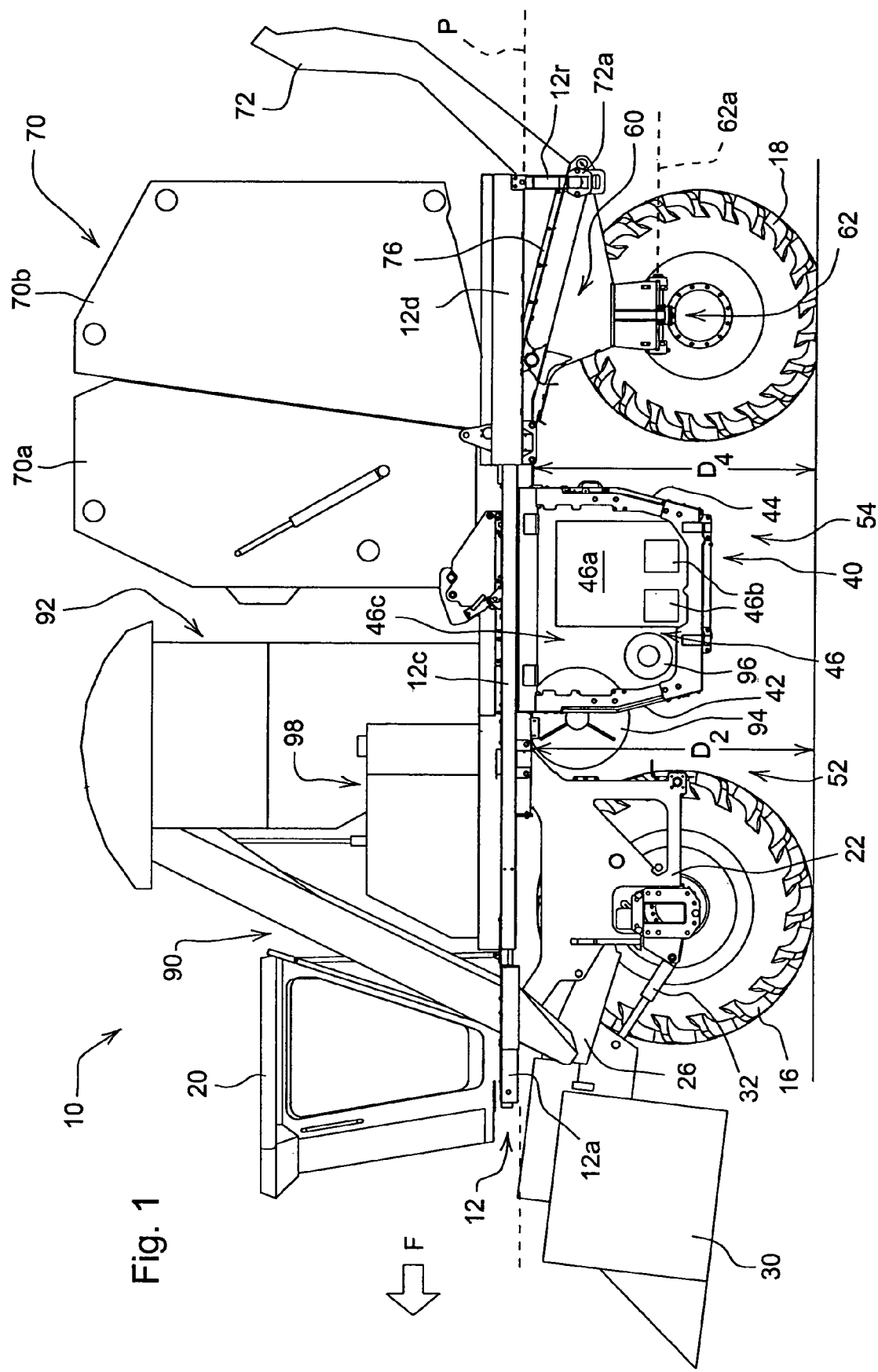
FIG. 1 is a side view of a cotton harvester with parts removed to better show the frame structure.

Referring now to FIG. 1, therein is shown a harvester 10 having frame structure 12 supported by driven forward ground wheels 16 and rear steerable wheels 18 for forward movement F over the ground. A cab 20 is supported on a forward portion 12a of the frame structure 12 forwardly of a front axle support 22 which extends downwardly from the portion 12a and supports the drive wheels 16. A row unit support frame assembly 26 is pivotally connected to the support 22, and row harvesting units 30 are transversely spaced on the frame assembly 26. Hydraulic lift cylinders 32 raise and lower the units 30.

The frame structure 12 is generally of tubular and panel construction with parallel sides 12s. The structure 12 includes a central module support area 12c generally centered in the fore-and-aft direction between the wheels 16 and the wheels 18 behind the forward portion 12a. A central power module support or engine compartment 40 depends from the area 12c and includes a forward transversely extending wall 42 offset rearwardly from the wheels 16 and an opposite rear wall 44 offset forwardly from the rear wheels 18. The power module support 40 provides primary support for main power components or power module 46 on the harvester, such as a transversely mounted engine 46a, hydraulic pumps 46b and a cooling module 46c located on the far side of the engine 46a as viewed in FIG. 1. The components are contained substantially below a plane P generally coinciding with the plane of the main frame structure 12.

As best seen in FIG. 1, the module support walls 42 and 44 define upright front and rear accommodation spaces 52 and 54 for access to front and rear portions of the power module support 40. The accommodation spaces 52 and 54 extend upwardly from the ground to the horizontal plane P and provide convenient operator access to the sides of the engine 46a and to other components connected to the support 40. The spaces 52 and 54 extend substantially continuously between the sides of the frame structure 12 and provide generally uninterrupted access to the sides of the engine and to other power module components under the horizontal plane P. The accommodation spaces 52 and 54 have heights D2 and D4, respectively, comparable to the height of the drive forward drive wheels 16 so that most operators can stand fairly erect as they work adjacent the module support.

The frame structure 12 as shown is generally rectangular and extends rearwardly to an aft frame portion 12d. A rear axle box frame or inverted pedestal 60 is centrally connected to the aft frame portion 12d, and an oscillatable rear axle assembly 62 is pivotally connected to the box frame 60 and mounts the steerable wheels 18 for oscillation about a central fore-and-aft extending axis 62a. The uppermost portions of the forward drive wheels 16 and the rear steerable wheels 18 are located closely adjacent but below the plane P.

The harvester 10, shown as a cotton picker with a rear-mounted cotton processor or crop receiver 70 such as a round baler, includes an unloading device 72 pivotally connected to an aft downwardly depending end 12r of the frame structure 12 for receiving a cotton bale or module released from the processor and depositing the bale or module on the ground or on a module carrier. The aft extremity of the processor or receiver 70 is generally aligned with the aft extremity of the frame 12.

Figure 2:
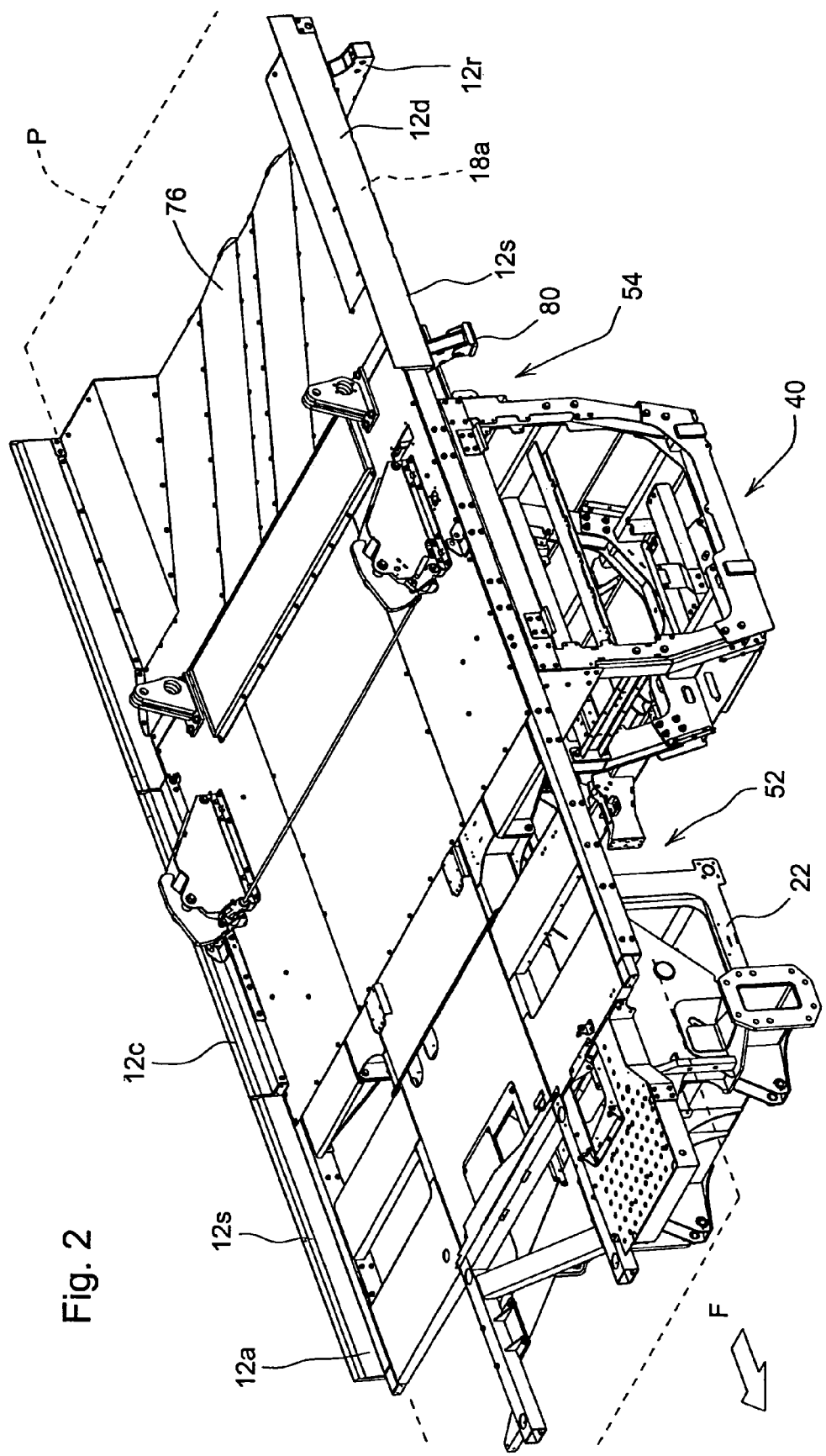
FIG. 2 is an enlarged perspective view of the frame structure for the harvester of FIG. 1.
Figure 3:
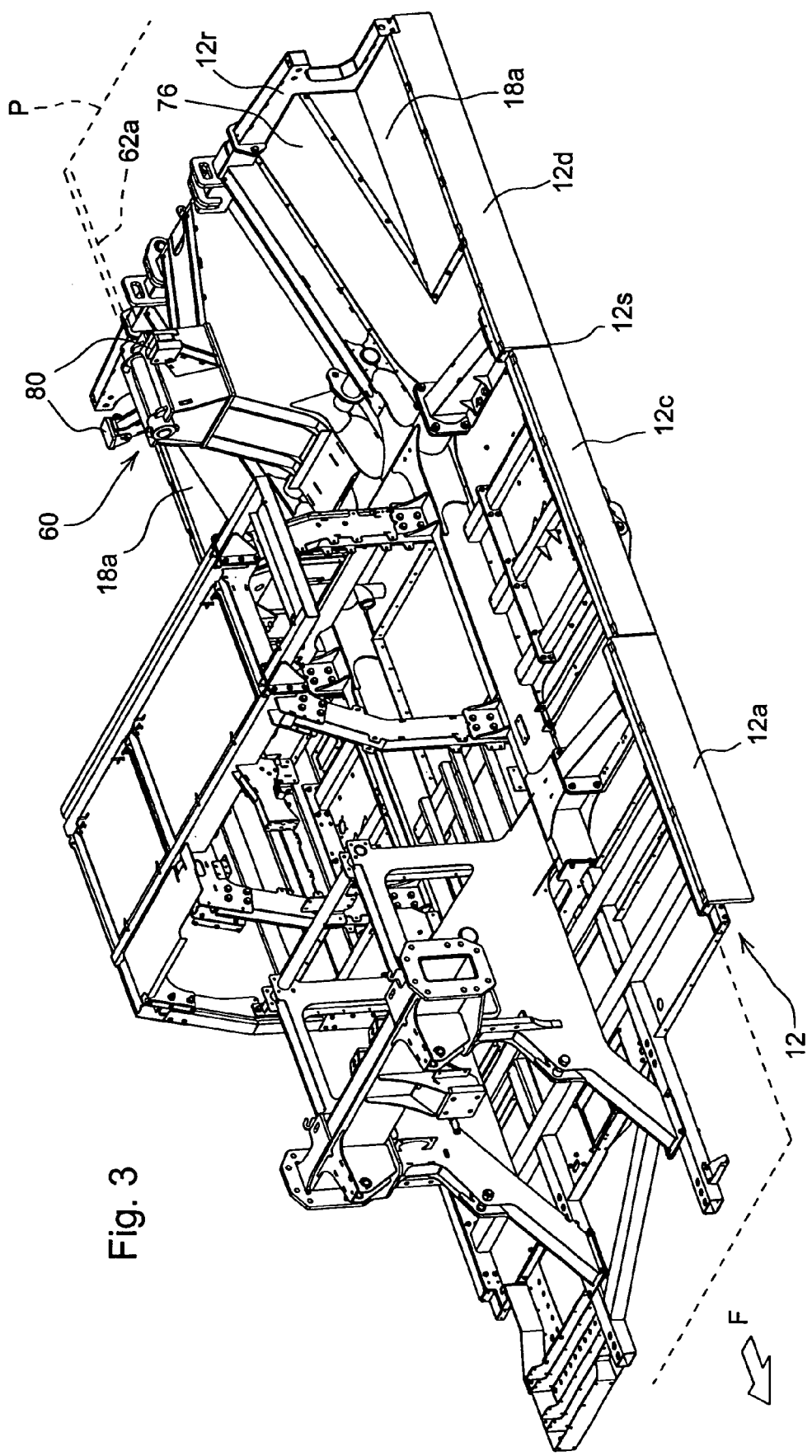
FIG. 3 is a view similar to FIG. 2 but inverted to better show frame underside details.

The aft end of the frame structure 12 includes a downwardly and rearwardly sloped ramp 76, best seen in FIG. 2, and the unloading device 72 is pivotally connected at 72a near the lower end of the ramp 76 for movement between a raised transport position (shown) and a lowered release position. The processor or baler 70 as shown includes pivoting clam shell sections 70a and 70b which open to release 2 bale unto the ramp 76 for movement onto the unloading device 72. Further details of the general structure can be found in commonly assigned U.S. Pat. Nos. 6,941,740; 6;921,996; 6,901,732 and 6,263,650. However, the length of the frame 12 and the wheelbase of the harvester 10 is increased compared with the previous structures for improved stability and for provision of relatively wide access spaces adjacent the front and rear of the power module. As shown, the accommodation spaces 52 and 54 have an approximate height greater than five feet and on the order of D2=D4=82 inches (2 meters). The approximate minimum width of accommodation spaces is 17 inches (43 cm), thereby providing excellent accessibility to the power module and other components in the accommodation areas.

Rear wheel accommodation spaces 18a are defined outwardly adjacent the ramp 76 and below the sides 12s of the frame structure 12 to receive the wheels 18 as the axle assembly 62 pivots. The spaces 18a receive the wheels 18 without interference, even when the wheels 18 are steered to their maximum turn positions and the axle is in maximum oscillated positions. Axle stops 80 project downwardly and outwardly from the lower portion of the box frame 60 to engage the pivoting axle assembly 62 at the maximum oscillated positions. As the axle assembly 62 oscillates over uneven ground, the wheels 18 remain below the plane P. The underframe wheel design facilitates use of oversized wheels to accommodate high capacity components without sacrificing turn radius.

An air duct system 90 extends from the row units 30 through the frame structure 12 to a first cotton receiver 92 supported on the frame structure 12 behind the cab 20 and forwardly of the processor 70. The receiver 92 provides intermediate storage for cotton received from the air duct system 90 and meters the cotton to the processor 70. A cotton fan 94 is located near the front of the power module support 40 and provides a source of air to the air duct system 90 to propel cotton material from the row units 30 to the receiver 92. The fan 94 is easily accessible from the space 52. An auxiliary gear box 96 driven by the engine 46a powers the hydraulic pumps 46b and the cotton fan 94.

Water, lubricant and fuel tanks indicated generally at 98 are supported on the frame structure 12 adjacent the receiver 92. The cab 20, processor 70, receiver 92 and tanks are supported above the plane P. The harvester construction provides for logical and sequential attachment of components in varying levels of assembly. For the cotton picker 10, the attachment sequence includes the tanks 98, the cab 20, and cotton handling system including the processor 70 and the first receiver 92. The accommodation space 52 facilitates access to the fan 96 and fan drive structure.

Figure 4:
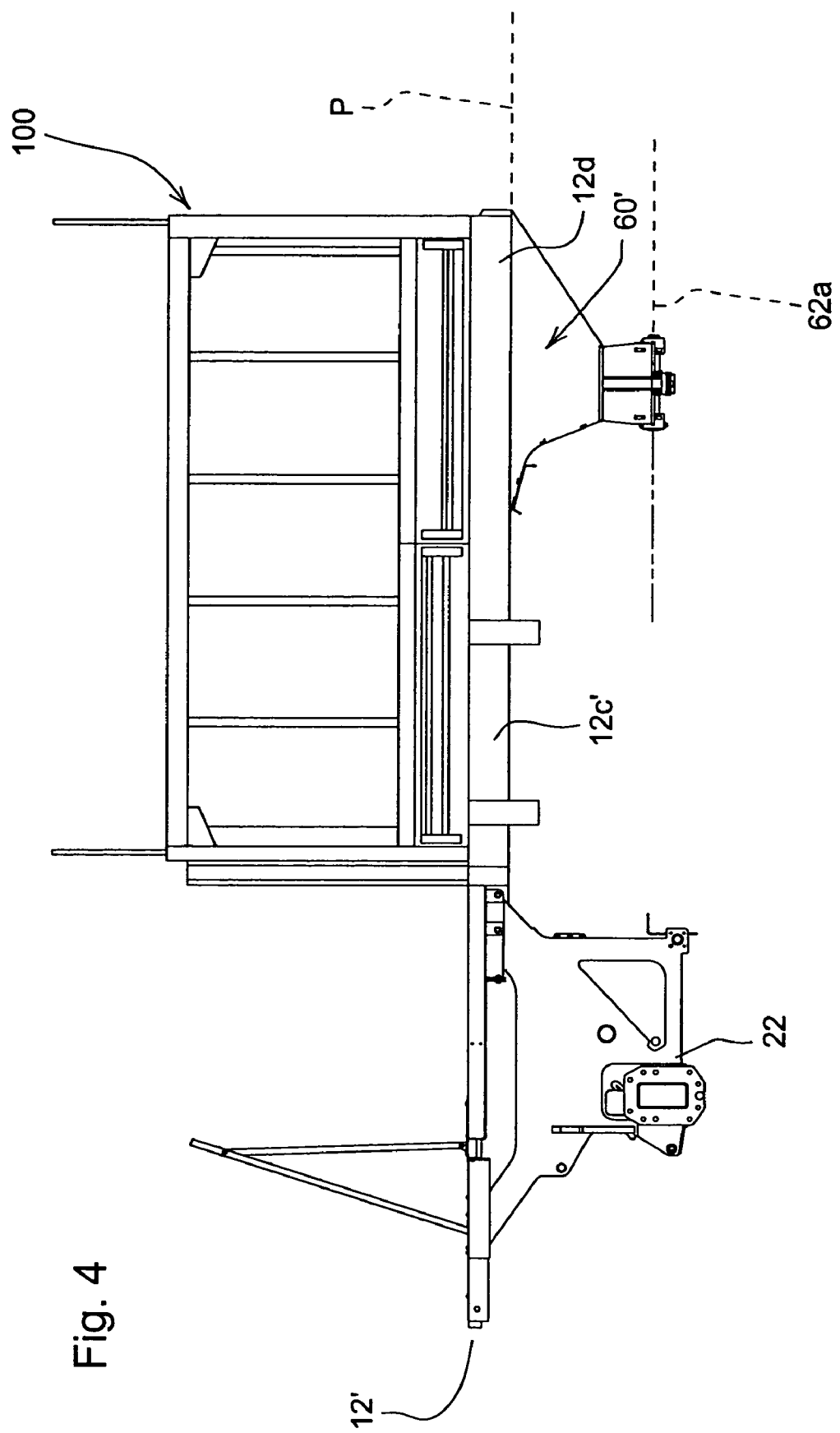
FIG. 4 is a view of a portion of a cotton harvester having a basket mounted at the aft end of the frame structure.

The arrangement of the frame structure 12 allows a conventional cotton basket 100 (FIG. 4) to be attached in place of the cotton handling system shown in FIG. 1. With the conventional basket construction, the ramp 76 may be eliminated, and the basket 100 is connected to the frame 12' above the frame sections 12c and 12d'. The box frame 60' for the oscillating axle assembly 62 is connected adjacent the plane P of the frame structure 12'. The air duct system 90 is positioned to direct harvested cotton into the upper forward portion of the basket 100. The above-described frame structure provides unparalleled access for assembly, inspection and maintenance.

Having described the preferred embodiment, it will become apparent that various modifications can be made without departing from the scope of the invention as defined in the accompanying claims.

The invention claimed is:
1. A cotton harvester frame structure comprising:
a generally planar rectangular frame having fore-and-aft extending sides;
a front axle support extending downwardly from a forward end of the rectangular frame;
forward drive wheels supported by the front axle support below the sides and having lowermost ground-contacting extremities and uppermost extremities, the uppermost extremities located below the frame;
the rectangular frame comprising a forward cab support portion located above the front axle support, a central module support located behind the forward cab support portion, and an aft crop receiver support located behind the central power module support;

a rear axle support extending downwardly from the crop receiver support at a central location between the fore-and-aft extending side members;

a rear axle connected to the rear axle support and supporting ground-engaging rear wheels offset inwardly from and below the side frame members; and a power module frame depending from the central module support forwardly of the rear wheels to define an upright rear accommodation space for access to a rear portion of the power module frame, the rear accommodation space extending upwardly from the ground to the side members a distance approximately equal to a distance between the uppermost extremities and lowermost ground contacting extremities.

2. The frame structure as set forth in claim 1 wherein the aft crop receiver support includes an angled frame portion located between the side frame members and extending downwardly and rearwardly from the plane of the rectangular frame, the rear axle including rear wheels having uppermost portions closely adjacent the horizontal plane and forwardmost extremities offset rearwardly of the power module frame a minimum distance of 17 inches (43 cm).

3. The frame structure as set forth in claim 2 wherein the rear axle support includes a box frame connected to the angled frame portion, and wherein the rear axle is oscillatable about a fore-and-aft extending axis, the rear wheels extending into accommodation spaces defined on opposite sides of the angled frame portion and below the side frame members.

4. The frame structure as set forth in claim 1 including a front axle supporting the forward drive wheels and defining with the power module frame an upright forward accommodation space extending upwardly from the ground to the side members.

5. The frame structure as set forth in claim 4 wherein the upright forward accommodation space extends between ground and the sides, the forward accommodation space having a height greater than five feet (1.5 meters) and the aft extremities of the drive wheels are located a minimum distance of 17 inches (43 cm) forwardly of the power module frame.

6. The frame structure as set forth in claim 5 wherein the rear accommodation space extends from the side members downwardly to the ground a distance of approximately 82 inches (2 meters).

7. The frame structure as set forth in claim 5 wherein the power module frame supports a transversely mounted engine, the accommodation spaces providing generally unimpeded operator access to the sides of the engine.

8. The frame structure as set forth in claim 7 further including a fan supported adjacent the power module, wherein the accommodation spaces provide operator access to the fan.

9. The frame structure as set forth in claim 1 further comprising a cab mounted on the cab support portion forwardly of the front axle support, a first crop receiving mechanism located on the central module support, and wherein the aft crop receiver support selectively receives one of the following:

a cotton baler; or a cotton basket.

10. A cotton harvester frame structure comprising:

a generally planar frame having fore-and-aft extending sides, a front and a rear;

a front axle support extending downwardly from the front of the frame and supporting forward wheels;

transversely spaced front wheels supported below the sides of the rectangular frame;

the frame comprising a forward cab support portion located above the front axle support, a central support area located behind the forward cab support portion, and an aft crop receiver support located behind the central power module support;

a rear axle support extending downwardly from the crop receiver support at a central location between the fore-and-aft extending side members;

a rear axle connected to the rear axle support and supporting ground-engaging rear wheels offset inwardly from and below the side frame members at the rear of the frame; and a power module support frame depending from the central support area for supporting an engine and an engine-driven component, the power module support frame including a forward wall offset rearwardly of the front wheels and providing a forward operator access space for access to a forward portion of the power module support frame and a rear wall offset forwardly of the rear wheels and providing a rearward operator access space for access to a rearward portion of the power module support frame, the operator access spaces including open areas extending generally between the ground and the side frame members adjacent the wheels.

11. The frame structure as set forth in claim 10 wherein the operator access spaces extend transversely substantially the entire distance between the sides of the frame.

12. The frame structure as set forth in claim 10 including wheel accommodation spaces located inwardly and below the sides of the frame closely adjacent the sides of the frame, and wherein the rear axle is oscillatable and the rear wheels comprise steerable wheels, the accommodation spaces preventing interference between the steerable wheels and the frame.

13. The frame structure as set forth in claim 10 wherein the power module frame, the forward wheels, and the ground-engaging rear wheels are all located below the plane of the frame, and wherein the accommodation spaces have a height of at least five feet (1.5 meters).

* * * * *